US010162521B2

United States Patent
Horn

(10) Patent No.: US 10,162,521 B2
(45) Date of Patent: Dec. 25, 2018

(54) MEDIA REGION MANAGEMENT BASED ON STORAGE HINTS FOR A DATA STORAGE DEVICE

(71) Applicant: Western Digital Technologies, Inc., Irvine, CA (US)

(72) Inventor: Robert L. Horn, Yorba Linda, CA (US)

(73) Assignee: Western Digital Technologies, Inc., San Jose, CA (US)

(*) Notice: Subject to any disclaimer, the term of this patent is extended or adjusted under 35 U.S.C. 154(b) by 218 days.

(21) Appl. No.: 14/871,054

(22) Filed: Sep. 30, 2015

(65) Prior Publication Data
US 2017/0090763 A1   Mar. 30, 2017

(51) Int. Cl.
*G06F 3/06* (2006.01)

(52) U.S. Cl.
CPC ............ *G06F 3/0604* (2013.01); *G06F 3/064* (2013.01); *G06F 3/0644* (2013.01); *G06F 3/0659* (2013.01); *G06F 3/0673* (2013.01); *G06F 3/0676* (2013.01)

(58) Field of Classification Search
CPC .... G06F 3/0604; G06F 3/0676; G06F 3/0644; G06F 3/064; G06F 3/0673; G06F 3/0659
See application file for complete search history.

(56) References Cited

U.S. PATENT DOCUMENTS

| | | | | |
|---|---|---|---|---|
| 7,043,619 B1 * | 5/2006 | Knight | .................. | G06F 3/0605 709/220 |
| 7,124,272 B1 * | 10/2006 | Kennedy | ............... | G06F 3/0613 711/173 |
| 7,984,200 B1 * | 7/2011 | Bombet | ................. | G11B 19/02 710/10 |
| 8,082,330 B1 * | 12/2011 | Castelli | ................. | G06F 9/5016 709/220 |
| 8,214,621 B2 | 7/2012 | Obr et al. | | |
| 8,239,584 B1 * | 8/2012 | Rabe | ..................... | G06F 3/0605 710/8 |
| 8,381,213 B1 * | 2/2013 | Naamad | ............. | G06F 12/0862 718/100 |
| 8,417,846 B2 | 4/2013 | Brune et al. | | |
| 9,063,861 B1 * | 6/2015 | Derbeko | ............. | G06F 12/0866 |
| 9,141,305 B2 * | 9/2015 | Tylik | ..................... | G06F 3/0605 |
| 9,317,215 B2 * | 4/2016 | Chen | ...................... | G06F 3/065 |

(Continued)

FOREIGN PATENT DOCUMENTS

WO   2014/144948 A1   9/2014

OTHER PUBLICATIONS

Tanenbaum, Andrew S., "Structured Computer Organization", Prentice-Hall, Inc., 2nd Edition, pp. 10-12. (Year: 1984).*

(Continued)

*Primary Examiner* — Arpan P. Savla
(74) *Attorney, Agent, or Firm* — Barry IP Law, P.C.

(57) ABSTRACT

A Data Storage Device (DSD) is in communication with a plurality of sensing devices. Data is received for storage in the DSD from a sensing device of the plurality of sensing devices. The received data is associated with at least one storage hint assigned to the sensing device. A media region of the DSD is selected from a plurality of media regions for storing the received data based on the at least one storage hint and at least one characteristic of the media region.

24 Claims, 8 Drawing Sheets

(56) References Cited

U.S. PATENT DOCUMENTS

| | | | |
|---|---|---|---|
| 9,760,306 B1* | 9/2017 | Bigman | G06F 3/0649 |
| 2001/0016114 A1 | 8/2001 | Van Gestel et al. | |
| 2002/0095546 A1* | 7/2002 | Dimitri | G11B 20/1217 |
| | | | 711/112 |
| 2003/0088591 A1* | 5/2003 | Fish | G06F 17/30902 |
| 2005/0022201 A1 | 1/2005 | Kaneda et al. | |
| 2007/0185902 A1* | 8/2007 | Messinger | G06F 3/0619 |
| 2007/0250883 A1 | 10/2007 | Busch et al. | |
| 2008/0002272 A1* | 1/2008 | Riedel | G11B 5/02 |
| | | | 360/55 |
| 2008/0215609 A1* | 9/2008 | Cleveland | G01D 21/00 |
| 2008/0263259 A1* | 10/2008 | Sadovsky | G06F 3/0613 |
| | | | 711/100 |
| 2013/0046780 A1 | 2/2013 | Tagawa | |
| 2014/0025337 A1* | 1/2014 | Blount | G05B 23/0221 |
| | | | 702/183 |
| 2014/0348492 A1 | 11/2014 | Watanabe et al. | |

OTHER PUBLICATIONS

Robert L. Horn, U.S. Appl. No. 14/870,562, filed Sep. 30, 2015, 28 pages.
Written Opinion dated Jan. 12, 2017, from international counterpart Application No. PCT/US2016/054004, 9 pages.
Supplementary European Search Report dated May 4, 2018, from European counterpart Application No. 16852423.9-1221, 12 pages.

* cited by examiner

| Device | Write Access Profile | Related Device(s) | Priority | Read Access Profile |
|---|---|---|---|---|
| 101 | 1 | 102, 103 | 1 | 0 |
| 102 | 2 | 101, 103 | 0 | 1 |
| 103 | 0 | 101, 102 | 1 | 2 |
| 104 | 0 | 122 | 0 | 0 |
| 122 | 0 | 104 | 0 | 1 |

FIG. 2

| Address | Time | Source | Data Loss Risk | Relative Priority |
|---|---|---|---|---|
| 0 | 8/1/15 1:59:10 | 101 | 0 | 0 |
| 1 | 8/1/15 2:00:11 | 102 | 1 | 0 |
| 2 | 8/1/15 2:06:53 | 104 | 1 | 1 |
| ⋮ | ⋮ | ⋮ | ⋮ | ⋮ |
| N | 8/4/15 4:04:36 | 122 | 0 | 0 |

FIG. 3

| Region | Type | Use Level Remaining Life | Avail. Capacity | Fragmentation | Power Level | Zones | Write Time | Read Time |
|--------|------|--------------------------|-----------------|---------------|-------------|-------|------------|-----------|
| 0 | SMR | 0 | 1 | 2 | 0 | 1 | 10 | 1 | 1 |
| 1 | SMR | 1 | 2 | 1 | 1 | 1 | 10 | 1 | 1 |
| 2 | CMR | 2 | 1 | 1 | 1 | 1 | 2 | 2 |
| ... | ... | ... | ... | ... | ... | ... | ... | ... | ... |
| N | NVSM | 2 | 0 | 3 | 2 | 0 | 1 | 1 | 0 |

FIG. 4

MEDIA REGION MANAGEMENT BASED ON STORAGE HINTS FOR A DATA STORAGE DEVICE

CROSS REFERENCE TO RELATED APPLICATION

This application is related to co-pending application Ser. No. 14/870,562 filed on Sep. 30, 2015, and entitled "DATA RETENTION MANAGEMENT FOR DATA STORAGE DEVICE" by Robert Horn, which is hereby incorporated by reference in its entirety.

BACKGROUND

Data Storage Devices (DSDs) are often used to record data onto or to reproduce data from a storage media such as a rotating magnetic disk or a solid-state memory. In some cases, DSDs may be used to archive or store data received from multiple sensing devices such as, for example, video cameras, accelerometers, microphones, or various other sensors. The data received from such sensing devices may have different characteristics such as, for example, whether the data arrives at the DSD as a continuous stream or as a discrete value. However, data arriving at the DSD from different sensing devices is generally treated the same by the DSD without consideration of the different characteristics of the data.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 2 depicts an example of storage hints assigned to sensing devices according to an embodiment.

FIG. 3 depicts an example of metadata generated by a DSD according to an embodiment.

FIG. 4 is an example of media characteristics for different media regions according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
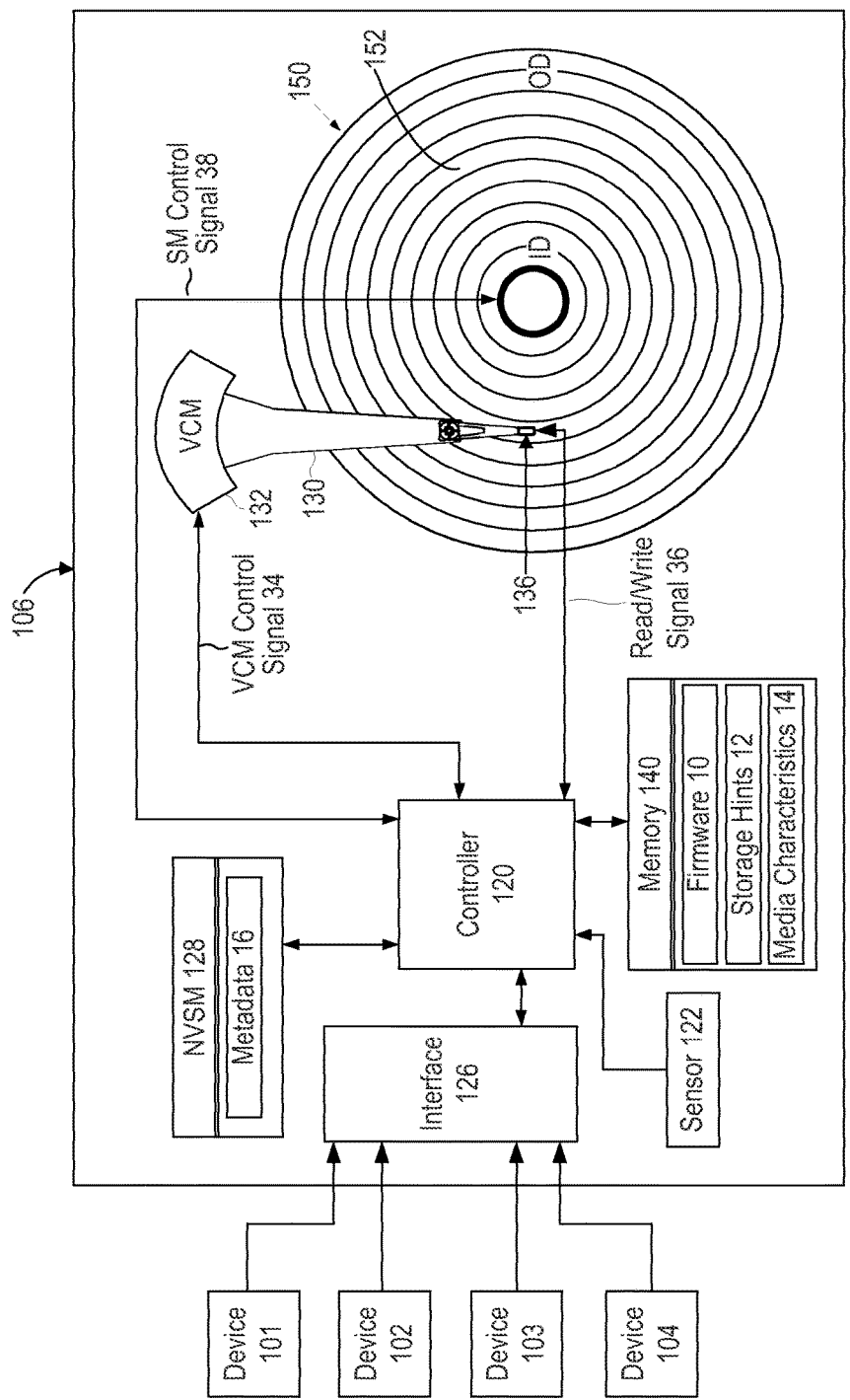
FIG. 1 is a block diagram depicting a Data Storage Device (DSD) according to an embodiment.

FIG. 1 shows an example of Data Storage Device (DSD) 106 which receives data from devices 101, 102, 103, and 104 according to an embodiment. Devices 101, 102, 103, and 104 can include sensing devices such as, for example, a video camera, accelerometer, microphone, motion sensor, temperature sensor, humidity sensor, light sensor, or other type of sensing device.

As shown in the example embodiment of FIG. 1, DSD 106 includes Non-Volatile Memory (NVM) in the form of rotating magnetic disk 150 and Non-Volatile Solid-State Memory (NVSM) 128. In other embodiments, DSD 106 can include other NVM media such as magnetic tape. In this regard, one or both of disk 150 and NVSM 128 can be omitted or replaced by a different NVM media. For example, NVSM 128 may be omitted in some embodiments so that the NVM of DSD 106 includes only disk storage media. In yet other embodiments, each of disk 150 or NVSM 128 can be replaced by multiple Hard Disk Drives (HDDs) or multiple Solid-State Drives (SSDs), respectively, so that DSD 106 includes pools of HDDs and/or SSDs.

DSD 106 includes controller 120 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In one implementation, controller 120 can include a System On a Chip (SoC).

Interface 126 is configured to interface DSD 106 with devices 101, 102, 103, and 104, and may interface using, for example, Ethernet or WiFi, and/or one or more bus standards. As will be appreciated by those of ordinary skill in the art, interface 126 can be included as part of controller 120.

The components of FIG. 1 may or may not be physically co-located. In this regard, one or more of devices 101 to 104 may be located remotely from DSD 106. Those of ordinary skill in the art will also appreciate that other embodiments can include more or less than those elements shown in FIG. 1 and that the disclosed processes can be implemented in other environments. For example, other embodiments can include a different number of devices providing data to DSD 106.

In the example of FIG. 1, DSD 106 includes sensor 122, which can also provide data for storage in at least one NVM of DSD 106. Sensor 122 can include, for example, an accelerometer or a temperature sensor to detect an environmental condition. In other embodiments, sensor 122 can be external to DSD 106 as with devices 101 to 104.

In FIG. 1, disk 150 is rotated by a spindle motor (not shown) and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks 152. A servo system (not shown) of controller 120 controls the rotation of disk 150 with SM control signal 38 and controls the position of head 136 using VCM control signal 34.

As will be appreciated by those of ordinary skill in the art, disk 150 may form part of a disk pack including multiple disks that are radially aligned with disk 150. In such implementations, head 136 may form part of a Head Stack Assembly (HSA) including heads arranged to read data from and write data to a corresponding disk surface in the disk pack.

In some implementations, some or all of the tracks 152 on disk 150 may be written as overlapping tracks with Shingled Magnetic Recording (SMR) as a way of increasing the number of Tracks Per Inch (TPI) on disk 150 by making the tracks narrower. SMR increases TPI by using a relatively wide shingle write head with a stronger magnetic field to overlap tracks like roof shingles. The non-overlapping portion then serves as a narrow track that can be read by a narrower read head.

Although a higher number of TPI is possible with SMR, the overlap in tracks can create a problem when writing data since new writes to a previously overlapped track affects data written in the overlapping track. For this reason, tracks are usually sequentially written to avoid affecting previously written data.

In one example, disk 150 can include one or more zones of overlapping tracks as a media region that is generally sequentially written using SMR and is well suited for archiving large amounts of streaming data. In such an example, a data steam from a video camera can be sequentially written in the media region with little movement of head 136. Other zones on disk 150 that include non-overlapping tracks written using Conventional Magnetic Recording (CMR) can provide a media region that is better suited for non-sequential writing or data that may need to be rewritten.

Other examples of media regions on disk 150 are also possible. In one example, a zone of tracks in an Outside Diameter (OD) portion of disk 150 shown in FIG. 1 may provide for faster access of data. A media region in the OD portion can typically allow for data to be read or written more quickly than at an Inner Diameter (ID) portion of disk 150 due to the greater circumference of disk 150 at the OD portion. The greater circumference at the OD portion allows for more of a track at the OD portion to be read or written for a given amount of rotation of disk 150 than in the shorter tracks at an ID portion of disk 150. A media region in the OD portion may then be used for storing data that is more frequently accessed or may have a higher priority or need for quick access.

DSD 106 may also include NVSM 128 for storing data which can serve as another media region or provide multiple media regions within NVSM 128 having different media characteristics. As discussed in more detail below, each of disk 150 and NVSM 128 can include one or more different media regions for storing data with each media region having different advantages or disadvantages for storing different types of data.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

As shown in FIG. 1, NVSM 128 stores metadata 16 which is associated with the data received from devices 101 to 104 or from sensor 122. As discussed in more detail below, controller 120 generates metadata 16 for managing a data storage size of the received data. In this way, it is ordinarily possible to determine which data should be kept and which data can be deleted, compressed or transferred to another DSD when more space is needed in the NVM of DSD 106. As used herein, compression can include a reduction in a sampling rate of the data, such as the removal of frames from video data to result in a lower quality video or the application of one or more lossless or lossy compression algorithms as known in the art.

DSD 106 also includes memory 140, which can include, for example, a Dynamic Random Access Memory (DRAM). In some embodiments, memory 140 can be a volatile memory used by DSD 106 to temporarily store data. In other embodiments, memory 140 can be an NVM that can be quickly accessed. Data stored in memory 140 can include data read from NVM, data to be stored in NVM, instructions loaded from firmware 10 for execution by controller 120, and/or data used in executing firmware 10.

As shown in FIG. 1, memory 140 also stores storage hints 12 and media characteristics 14 which can be used to select a media region for storing data. As discussed in more detail below, NVSM 128 and disk 150 can include a plurality of media regions that have different media characteristics. In an implementation where memory 140 is a volatile memory, each of storage hints 12 and media characteristics 14 can be maintained across power cycles in an NVM of DSD 106 such as on disk 150 or in NVSM 128.

Storage hints 12 are assigned to the different sensing devices (i.e., devices 101 to 104 and sensor 122) and can provide information about the data that is received from a particular device. For example, storage hints 12 may include information indicating information about how data from the sensing device is expected to be read or written (e.g., in short bursts or as a continuous stream) or whether the data received from the device is related to other data received from a different device.

Media characteristics 14 can include information about a particular media region. For example, media characteristics 14 may include information indicating a media type (e.g., disk, CMR, SMR, or solid-state memory), a level of use, a remaining usable life, an available storage capacity, a level of fragmentation of data in the media region, a level of power associated with operating the media region, a number of zones in the media region, a time for reading data from the media region, or a time for writing data in the media region.

By considering both the storage hints pertaining to data received at DSD 106 and the media characteristics of the media regions, it is ordinarily possible to better select a location for storing the data and improve the performance of DSD 106.

In operation, interface 126 receives data from devices 101 to 104 via interface 126 for storing the data in NVM of DSD 106. Controller 120 may buffer the received data in memory 140 before storing the data on disk 150 or in NVSM 128.

For data to be written on disk 150, a read/write channel (not shown) of controller 120 may encode the buffered data into write signal 36 which is provided to head 136 for magnetically writing data on disk 150. A servo system of controller 120 can provide VCM control signal 34 to VCM 132 to position head 136 over a particular track for writing the data.

In addition, controller 120 may need to read data from NVM to manage a size of the stored data or to provide the stored data to another device. To read data from disk 150, the servo system positions head 136 over a particular track on disk 150. Controller 120 controls head 136 to magnetically read data stored in the track and to send the read data as read signal 36. A read/write channel of controller 120 can then decode and buffer the data into memory 140 for use by controller 120 or for transmission to another device via interface 126.

For data to be stored in NVSM 128, controller 120 receives data from interface 126 and may buffer the data in memory 140. In one implementation, the data is then encoded into charge values for charging cells (not shown) of NVSM 128 to store the data.

To access data stored in NVSM 128, controller 120 in one implementation reads current values for cells in NVSM 128 and decodes the current values into data that can be transferred to another device via interface 126.

FIG. 2 depicts an example of storage hints 12 assigned to devices 101 to 104 and sensor 122 according to an embodiment. As shown in FIG. 2, storage hints 12 include a write access profile, an indication of whether data received from one sensing device is related to data received from one or more other sensing devices, a priority level, and a read access profile. Other embodiments may include different storage hints as part of storage hints 12.

As will be discussed in more detail below with reference to FIGS. 5 through 7, storage hints 12 can be used by controller 120 to select a media region for storing data based on media characteristics of the media regions. In addition, storage hints 12 can be used by controller 120 in performing maintenance operations such as Garbage Collection (GC) to reclaim one or more portions of the media regions to store new data.

In some implementations, storage hints 12 can be configured in the field when new sensing devices are connected to interface 126 or at the factory in a case where it is known in advance that DSD 106 may receive data from particular sensing devices. In one implementation, DSD 106 acts as a plug and play device that detects sensing devices connected to interface 126 and requests storage hints from the sensing device to add to or update storage hints 12. In addition, some storage hints may be learned or assigned by DSD 106 after receiving data from a sensing device. In one implementation, controller 120 may determine a write access profile associated with a sensing device after receiving a certain amount of data from the sensing device or after a certain period of time of being connected to the sensing device.

In the example of FIG. 2, each row of storage hints 12 provides information about the data received from a particular sensing device. In the case of sensing device 101, a write access profile of "1" is indicated, with sensing devices 102 and 103 providing related data, a priority level of "1," and a read access profile of "0." As an example, sensing device 101 may be a video camera that provides video data as a continuous stream of data. In such an example, a write access profile of "1" can indicate that the data generated by or received from sensing device 101 is usually continuous for more than a predetermined period of time such as one minute.

Other write access profiles can be indicated such as, for example, whether a data rate from the sensing device is greater than or less than a threshold rate, whether data is received more or less often than a threshold frequency, or whether data received from the sensing device is continuous for longer or less than a predetermined period of time. In this regard, some examples of write access profiles can include data generated in high data rate bursts, as low data rate discrete values, or as a continuous stream of data with a low or high data rate.

As shown in FIG. 2, the data received from sensing device 101 is related to the data received from sensing devices 102 and 103. The relation between the sensing devices can be, for example, that each sensing device is monitoring the same physical area or that the data from one sensing device can affect the importance of the data collected by another sensing device. In one example, sensing device 101 can be video camera near a door, sensing device 102 can be a microphone near the door, and sensing device 103 can be a motion sensor near the door. In such an example, the data received from each of the sensing devices 101, 102, and 103 can be related in that they are located near the same physical area. In addition, the priority or importance of the video data generated by sensing device 101 and the audio data generated by sensing device 102 can be elevated by data generated by sensing device 103 indicating motion near the door.

The sensing devices used with DSD 106 are not limited to the examples provided above. For example, sensing devices 101 to 104 in some implementations can include sensors located in machinery such as an engine, or sensors that are used as part of a manufacturing process. Generally speaking, some embodiments of the invention may be applied to scenarios where a large amount of data is constantly being generated and for which there may be some analytical or historical reference value in later assesses, but the storage space is limited.

As discussed in more detail below, the sensing device providing the data or the relation between multiple sensing devices providing data can be used in determining a media region for storing the data. In one example, all of the data from a particular sensing device may be stored in the same media region to provide quicker access among different portions of the data or because a particular media region may be better suited for storing a certain type of data.

The priority metadata shown in FIG. 2 can indicate a priority level assigned to the data received from a particular sensing device. In the example of FIG. 2, a priority of "1" can indicate a higher priority where such data may be retained longer or kept at a higher resolution for a longer period of time than data associated with a lower priority level of "0".

The read access profile can indicate how the data from a particular sensing device is expected to be accessed by another device, such as a host. A read access profile can indicate, for example, an expected size of data accessed at one time, a frequency of access, or whether the data is accessed as a data stream. The read access profile can be preconfigured for a particular sensing device or it can be determined by controller 120.

FIG. 3 depicts an example of metadata 16 generated by controller 120 according to an embodiment. Metadata 16 may be generated as part of a preprocessing operation when data is received by DSD 106 and/or subsequently generated after the data has been stored in NVM of DSD 106. As discussed in more detail below with reference to FIGS. 8 and 9, metadata 16 can be used to perform maintenance operations after storing the data such as in part of a GC process or other data storage capacity management of NVM in DSD 106.

In the example of FIG. 3, metadata 16 includes an address identifying a location in NVM where the associated data is stored, a time when the data was received, the source or sensing device that generated the data, a risk of data loss for the data, and a relative priority for the data. Other embodiments may include different metadata as part of metadata 16.

The time the data was received can be used, for example, when determining which data should be compressed or deleted in managing a storage capacity of NVM in DSD 106. In this regard, and as discussed in more detail below, data received around the same timeframe can be stored in the same media region to improve the efficiency of maintenance operations such as GC.

In addition, the source of the data (e.g., devices 101 to 104 or sensor 122) can be used correlate data for analysis of the data or as part of a maintenance operation. Data received from the same device or from related devices may be stored in the same media region to improve management of the data or to improve a speed in accessing the related data.

The risk of data loss may be generated after the data has been stored in NVM and can indicate if there is an increased risk of the data becoming corrupted or lost. In one example, the data may be stored in a portion of disk 150 such as an SMR media region that could have a higher risk of Adjacent Track Interference (ATI) or Wide Area Track Erasure (WATER). Such data may be indicated in metadata 16 as having a higher risk for data loss with a "1" or other flag as shown for the data located at addresses 1 and 2 in FIG. 3.

In an example where NVSM 128 is a NAND flash memory, the risk of higher data loss may come from a block of NVSM 128 being rewritten more than a predetermined number of times. Such rewriting of a block can increase the number of Program/Erase (P/E) cycles, which can deteriorate the ability of the block to store data. Knowing which data is at a higher risk for data loss can ordinarily allow controller 120 to improve maintenance operations such as GC.

The relative priority metadata shown in FIG. 3 can indicate whether certain data received from a sensing device is more important than other data received from the same sensing device. In one example, certain portions of video data received from sensing device 101 may have a higher priority than other portions of video data if received in close temporal proximity to an indication of motion from another sensing device in the same area. The relative priority can be used by controller 120 when determining which data to delete or compress as part of a capacity management process.

FIG. 4 is an example of media characteristics 14 according to an embodiment. As shown in the example of FIG. 4, media region characteristics 14 include characteristics of the different media regions of DSD 106 with each row in FIG. 4 representing characteristics for a different media region. As discussed above, a media region can include all of or portions of disk 150 and NVSM 128 or other NVM of DSD 106.

In one implementation, media characteristics 14 can be configured as part of a factory set up process for DSD 106. In other implementations, media characteristics 14 can be set up in the field using a host or other interface to DSD 106 or by controller 120 executing firmware 10 or other computer executable instructions.

In FIG. 4, media characteristics 14 include a media type, a level of use, a remaining usable life, an available storage capacity, a level of fragmentation of data stored in the media region, a level of power for operating the media region, a number of zones in the media region, a time to write data in the media region, and a time to read data from the media region. Other embodiments may include different media characteristics than those shown in FIG. 4.

In the example of FIG. 4, the media type can indicate whether the media region is located in NVSM 128 or on disk 150, and more particularly, whether the media region is in a CMR or SMR portion of disk 150. As discussed in more detail below, the media type can be used to determine a location for storing data that is better suited to a particular media type. One example may include storing streaming data in an SMR media region since such media regions are generally sequentially written.

The use level indicates how often the media region has been accessed for storing or retrieving data. For example, a use level of "2" for media regions 2 and N in FIG. 4 can indicate that these media regions are accessed for reading and writing data more frequently than other media regions such as media regions 0 and 1. Data indicated by a storage hint as being more likely to be frequently accessed can be, for example, stored in media regions with a higher use level so as to decrease a time to access frequently used data.

The remaining usable life can provide an indication of whether the media region is reaching an end of its usable life. The remaining usable life can be due to factors affecting the reliability of the storage media (e.g., disk 150 or NVSM 128) or components related to accessing data in the media region (e.g., head 136). In one implementation, the remaining usable life may reflect a number of write operations performed in the media region or a number of read or write errors encountered in the media region. In one implementation, controller 120 may use a media region with a longer remaining usable life for storing higher priority data.

The available capacity in FIG. 4 can indicate a remaining available storage capacity of the media region. Controller 120 may select media regions for storing data based on the amount of capacity available in the media region or may use the available capacity to identify media regions in need of GC to reclaim portions of the media region for storing new data. In one example, a large media region of overlapping tracks on disk 150 written with SMR can be used to store streaming data that will consume more storage capacity than data received from other sensing devices. More randomly received data that may consume less space can be written in media regions with a smaller available capacity.

The level of fragmentation indicates whether data stored in the media region is broken up in different portions of the media region. When selecting a media region, controller 120 may consider the fragmentation of the media region to select less fragmented media regions for storing data streams that could benefit from being written sequentially in the media region. In addition, controller 120 may identify a media region with a higher level of fragmentation for a GC process to allow the media region to store larger portions of data.

Controller 120 may consider the power level in operating the media region when selecting a media region for storing data. In one example, controller 120 may initially select a media region using a lower power level such as NVSM 128 to avoid having to consume more power in spinning up disk 150.

The number of zones in the media region can, for example, refer to a number of zones of tracks 152 in the case of a media region on disk 150 or a number of blocks in NVSM 128. In one example, controller 120 may select a media region with multiple zones to store related data from different sensing devices in different zones of the same media region. This may allow for quicker access of both sets of data and may provide for efficiency when deleting or compressing the related data.

The write time can, for example, indicate an average time needed to write a certain amount of data in the media region. Some media regions such as those located in an OD portion of disk 150 may typically allow for data to be written more quickly than other media regions such as those located in an ID portion of disk 150. In one implementation, controller 120 may use a media region with a relatively short write time for storing data from a sensing device associated with a higher data rate and use a different media region with a longer write time for storing data from a sensing device associated with a lower data rate.

The read time can, for example, indicate an average time needed to read a certain amount of data from the media region. Some media regions such as those in NVSM 128 may typically allow for data to be read more quickly than other media regions such as those on disk 150 that involve a mechanical latency in positioning head 136 over a particular track 152. In one implementation, controller 120 may use a media region with a relatively short read time for storing data from a sensing device associated with a higher priority so that the high priority data can ordinarily be read quicker.

Media Region Selection Examples

Figure 5:
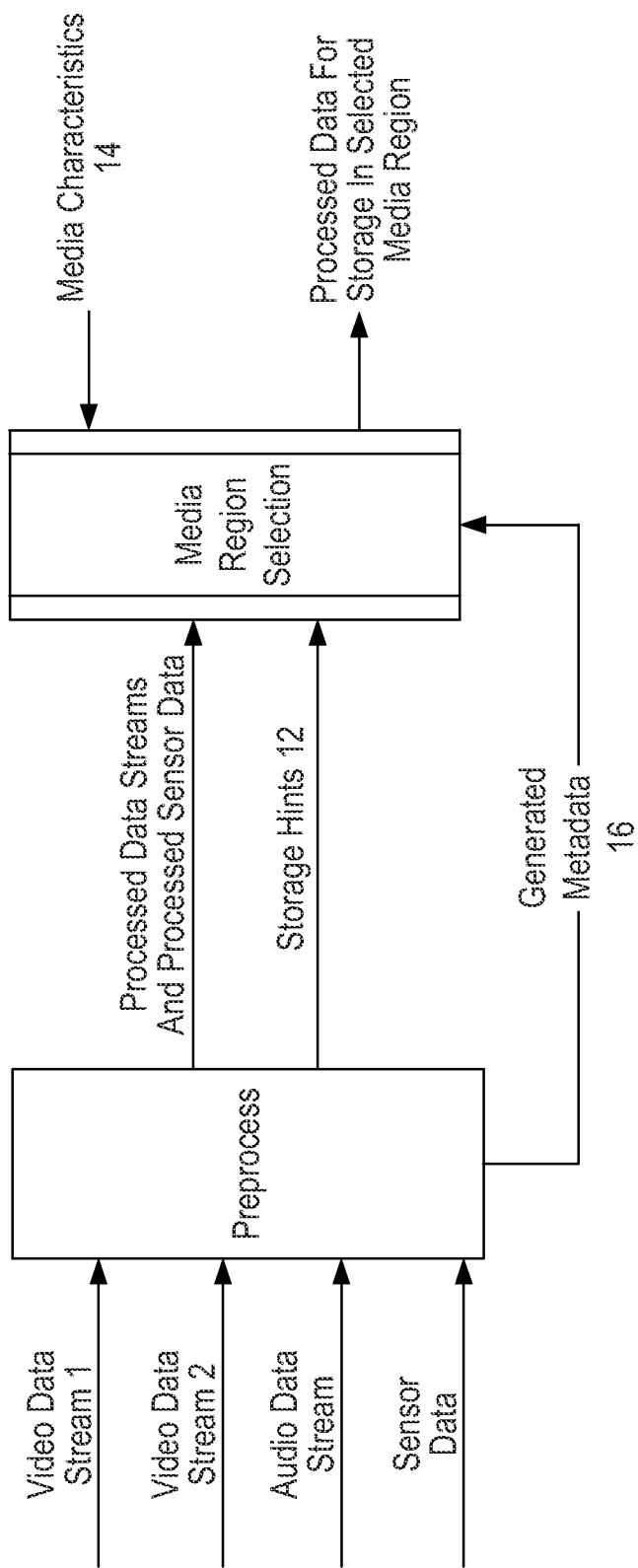
FIG. 5 is a block diagram illustrating a preprocessing of data and the selection of a media region for storing data according to an embodiment.

FIG. 5 is a block diagram illustrating a preprocessing of data and the selection of a media region according to an embodiment. In the example of FIG. 5, two video data streams, an audio data stream, and sensor data are received by controller 120 and preprocessed to generate at least a portion of metadata 16, and associate storage hints 12 with the processed data streams and sensor data. As noted above, some of metadata 16 may be generated after the received data has been stored in a media region of NVM. In other embodiments, all of metadata 16 may be generated outside of the preprocessing shown in FIG. 5 such that all of metadata 16 is generated after the received data has been stored in a media region.

In the example of FIG. 5, storage hints 12 and media characteristics 14 are used by controller 120 to select a media region for storing the processed data streams and sensor data. In some implementations, the generated metadata 16 may also be stored in the selected media region with its associated received data. In other implementations, the generated metadata may be stored in a different media region or in a different NVM than where its associated received data is stored.

Figure 6:
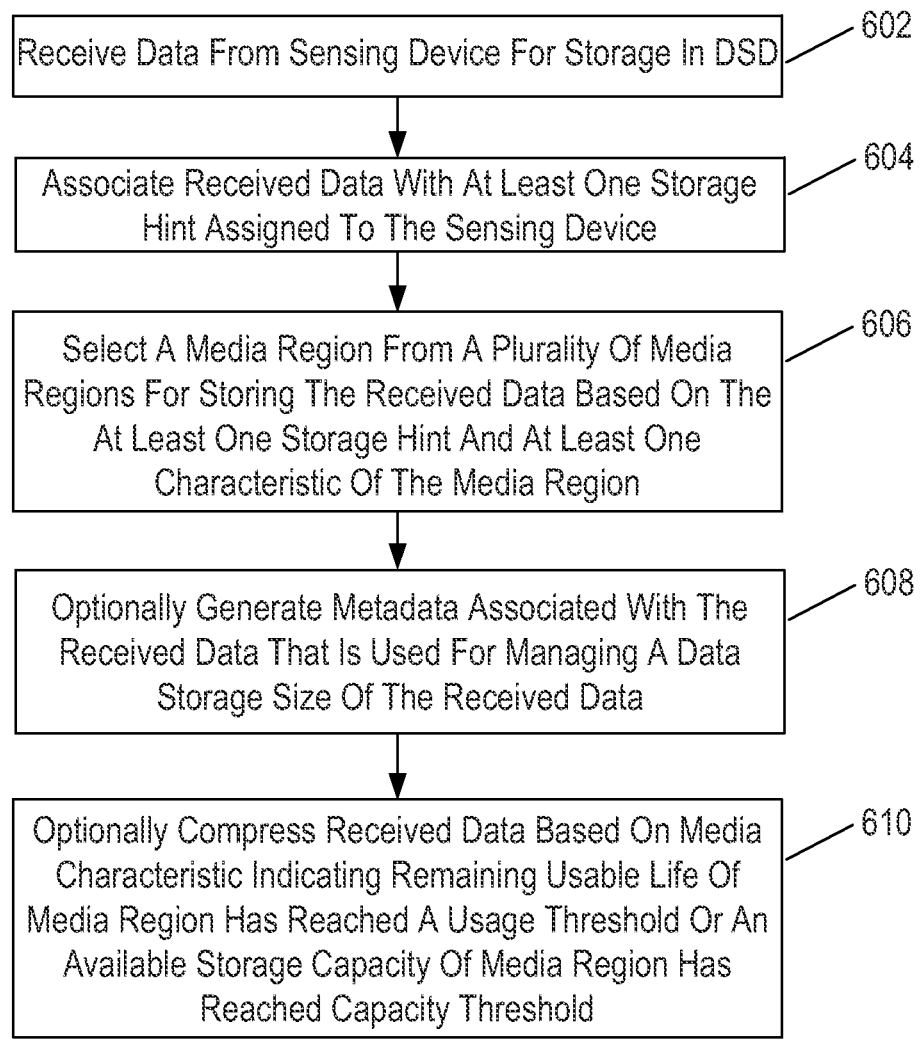
FIG. 6 is a flowchart for a media region selection process according to an embodiment.

FIG. 6 is a flowchart for a media region selection process that can be performed by controller 120 executing firmware 10 according to an embodiment. In block 602, controller 120 receives data from a sensing device for storage in DSD 106. Controller 120 in block 604 associates the received data with at least one storage hint assigned to the sensing device. In this regard, controller 120 may first identify which sensing device is sending the data and then reference storage hints 12 for the identified sensing device. With reference to the example of storage hints 12 in FIG. 2, the at least one storage hint can include an indication of whether data is typically received or generated by the sensing device with a particular write access profile (e.g., a particular data rate, continuous, or in bursts), whether the data is related to data received from another sensing device, a priority level for the data received from the sensing device, or a particular read access profile (e.g., data accessed with a certain size or as a continuous stream).

In block 606, controller 120 selects a media region from a plurality of media regions for storing the received data based on the associated storage hint or hints and at least one characteristic of the media region. In the example of media characteristics 14 shown in FIG. 4, controller 120 may consider, for example, the media type, available capacity, and fragmentation of the media regions in selecting a media region for storing data indicated by storage hints 12 as having a streaming write access profile. In such an example, controller 120 may select a media region having an SMR media type on disk 150 with a larger amount of remaining available capacity and a low fragmentation level. On the other hand, if a storage hint indicates that the received data has a write access profile that is not continuous and that the data has a high priority, controller 120 may select a media region in NVSM 128 that has a longer remaining usable life than other media regions in NVSM 128.

In block 608, controller 120 optionally generates metadata (e.g., metadata 16) associated with the received data that is used for managing a data storage size of the received data. The metadata can be generated as part of a preprocessing as shown in FIG. 5 discussed above, or some or all of the metadata can be generated after the data has been stored in the selected media region. In this regard, the metadata may result from analysis of the stored data that can be used to manage retention or a size of the data.

In block 610, controller 120 optionally compresses the received data based on a media characteristic indicating that a remaining usable life of the selected media region has reached a usage threshold or an available storage capacity of the selected media region has reached a capacity threshold. This optional compressing can form part of the preprocessing shown in FIG. 5 to produce a processed data stream or sensor data that has been compressed based on a media characteristic of the selected media region. Controller 120 may apply a higher or lower compression ratio based on the remaining usable life or available storage capacity of the media region. If there is less remaining usable life or less available storage capacity, controller 120 may then apply a higher compression ratio to save more space when storing the data in the media region.

Figure 7:
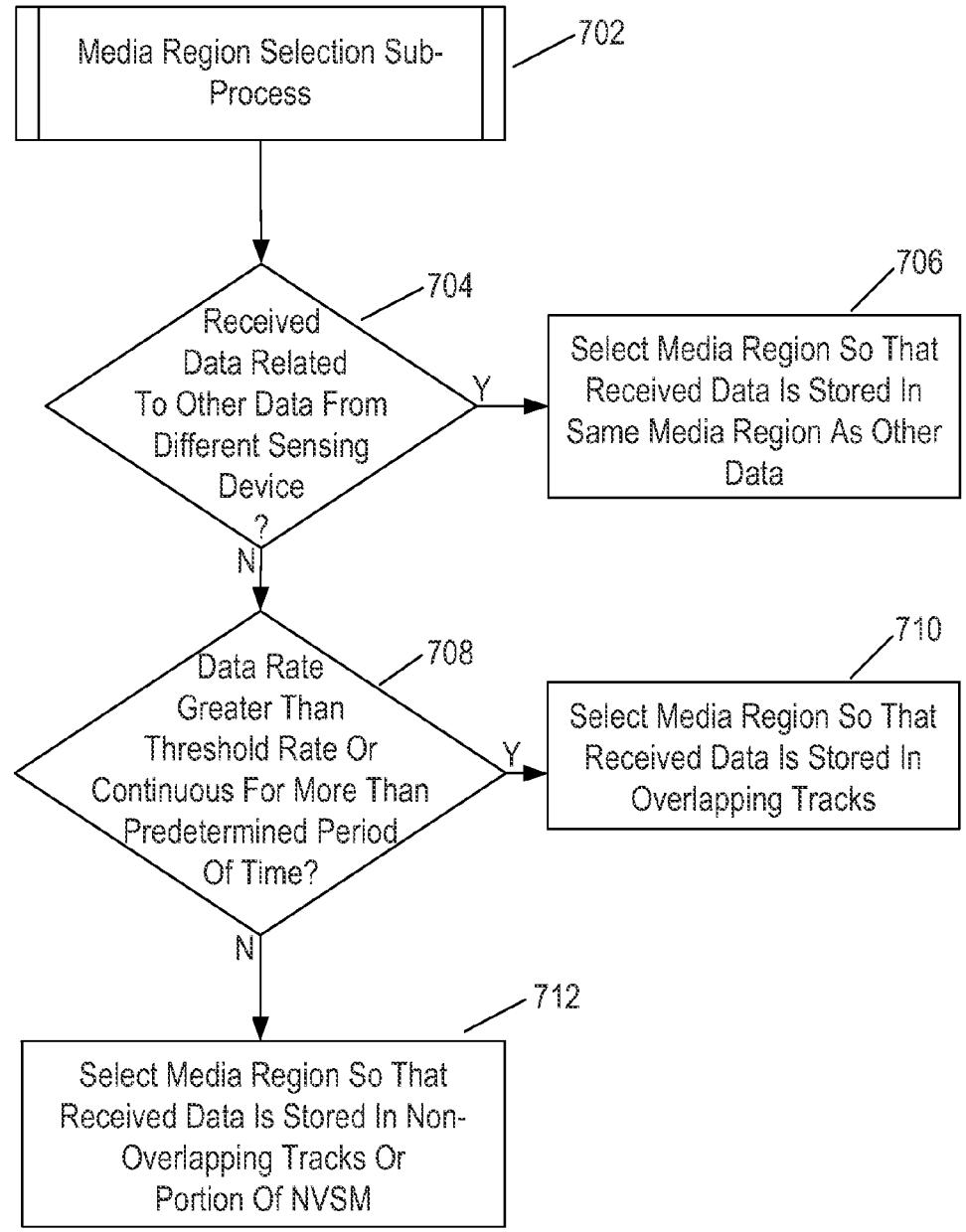
FIG. 7 is a flowchart for a media region selection sub-process according to an embodiment.

FIG. 7 is a flowchart for an example media region selection sub-process that can be performed by controller 120 executing firmware 10, and as part of block 606 in FIG. 6 according to an embodiment. Other embodiments may use different selection criteria than that shown in FIG. 7.

In block 702, controller 120 initiates the media region selection sub-process to select a media region of DSD 106 to store received data. In block 704, controller 120 determines whether data received by DSD 106 is related to other data received from another sensing device. Controller 120 can use a storage hint 12 that indicates whether the data received from one sensing device is related to data received from another sensing device in determining whether the data is related.

If it is determined that the data is related in block 704, controller 120 in block 706 selects a media region so that the received data is stored in the same media region as the related data. This can ordinarily allow for quicker reading and writing of both sets of related data since they are located in close physical proximity. In other embodiments, rather than being stored in the same media region, the received data can be stored in a media region that is in close proximity to another media region that stores the related data.

On the other hand, if it is determined in block 704 that the data is not related, controller 120 in block 708 determines whether a data rate for the received data is greater than a threshold rate or if the data is continuous for more than a predetermined period of time. As discussed above, this determination may be made with reference to a storage hint 12 indicating a write access profile for data received from or generated by the sensing device sending the received data.

If it is determined that the data rate is greater than a threshold rate or not continuous for more than a predetermined period of time, controller 120 in block 710 selects a media region so that the received data is stored in overlapping tracks on disk 150. An SMR media region including overlapping tracks can be used for handling high data rate writes because data is generally sequentially written in an SMR media region which can allow for a faster writing of data than in a CMR media region where data might be written in fragments throughout the media region. The sequential writing of an SMR media region may also be well suited to data that is continuous for more than a predetermined period of time since the stream of data can be sequentially written in the SMR media region.

If it is determined in block 708 that the data rate is not greater than the threshold rate or that the data is not continuous for more than the predetermined period of time, controller 120 in block 712 selects a media region so that the received data is stored in non-overlapping tracks or a portion of NVSM 128. Since data that is not continuous for more than the predetermined period of time is more likely to be written in shorter bursts, such data is written in media regions that can better support more random writing than SMR media regions on disk 150. Controller 120 can use media characteristics 16 to identify eligible CMR media regions or media regions in NVSM 128.

Example Capacity Management Processes

Figure 8:
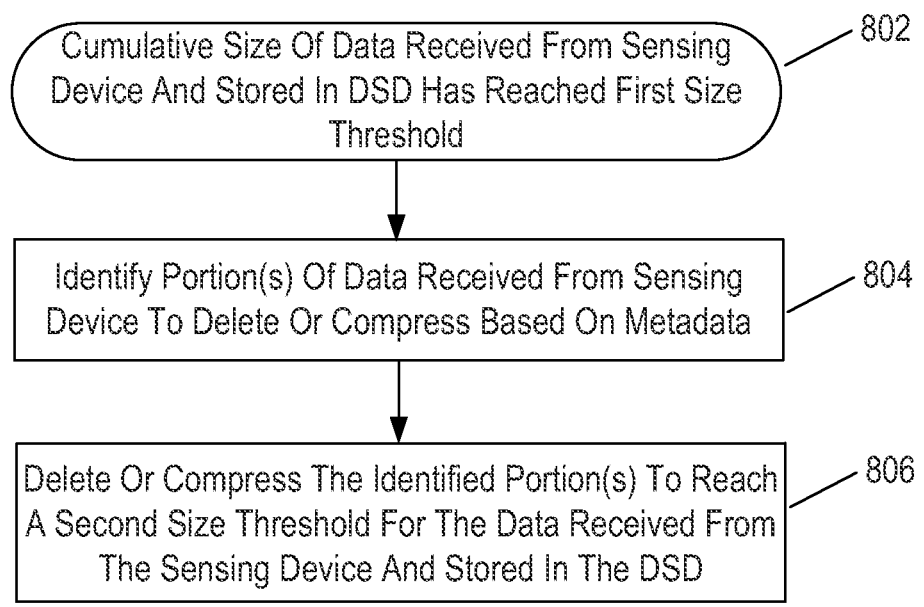
FIG. 8 is a flowchart for a capacity management process for data received from a sensing device according to an embodiment.

FIG. 8 is a flowchart for an example capacity management process that can be performed by controller 120 executing firmware 10 according to an embodiment. In some implementations, the process of FIG. 8 may be performed as a background activity. Additional examples of data capacity management using metadata can be found in the cross referenced, co-pending application Ser. No. 14/870,562, filed on Sep. 30, 2015, and incorporated by reference above.

In block 802, controller 120 determines that a cumulative size of data received from a sensing device and stored in DSD 106 has reached a first size threshold. In block 804, controller 120 identifies one or more portions of the data received from the sensing device to delete or compress based on metadata (e.g., metadata 16) indicating when the one or more portions were received and/or a risk of data loss for the one or more portions. The metadata may have been generated when the data was received or may have been generated after being stored in NVM.

In the case where the metadata indicates when the data was received, controller 120 can use the metadata to identify portions of the data that was received earlier than others for deletion or compression. In one implementation, data received around the same period of time from the same sensing device are stored together in the same media region so that the data in an entire media region or in an entire zone of a media region can be deleted or compressed at the same time. This can ordinarily improve the efficiency and effectiveness of the capacity management process since an entire media region or a contiguous portion of a media region becomes available for storing new data as a result of performing the capacity management process.

In the case where the metadata indicates a risk of data loss for one or more portions of the received data, the capacity management process can be performed for the media regions having the highest risk of data loss. As part of the capacity management process, the data in such high risk media regions may be deleted or relocated to a different media region with a lower risk of data loss after compressing the data.

In block 806, controller 120 deletes or compresses the one or more portions of data identified in block 804. The deletion or compression of data in block 806 continues until a second size threshold is reached for the data received from the sensing device and stored in the DSD. The second size threshold can be a lower data size than the first size threshold. In other embodiments, a second size threshold may not be used so that the identified portion is deleted or compressed and the process of FIG. 8 is initiated again when the cumulative size of the data received from the sensing device again reaches the first size threshold.

Figure 9:
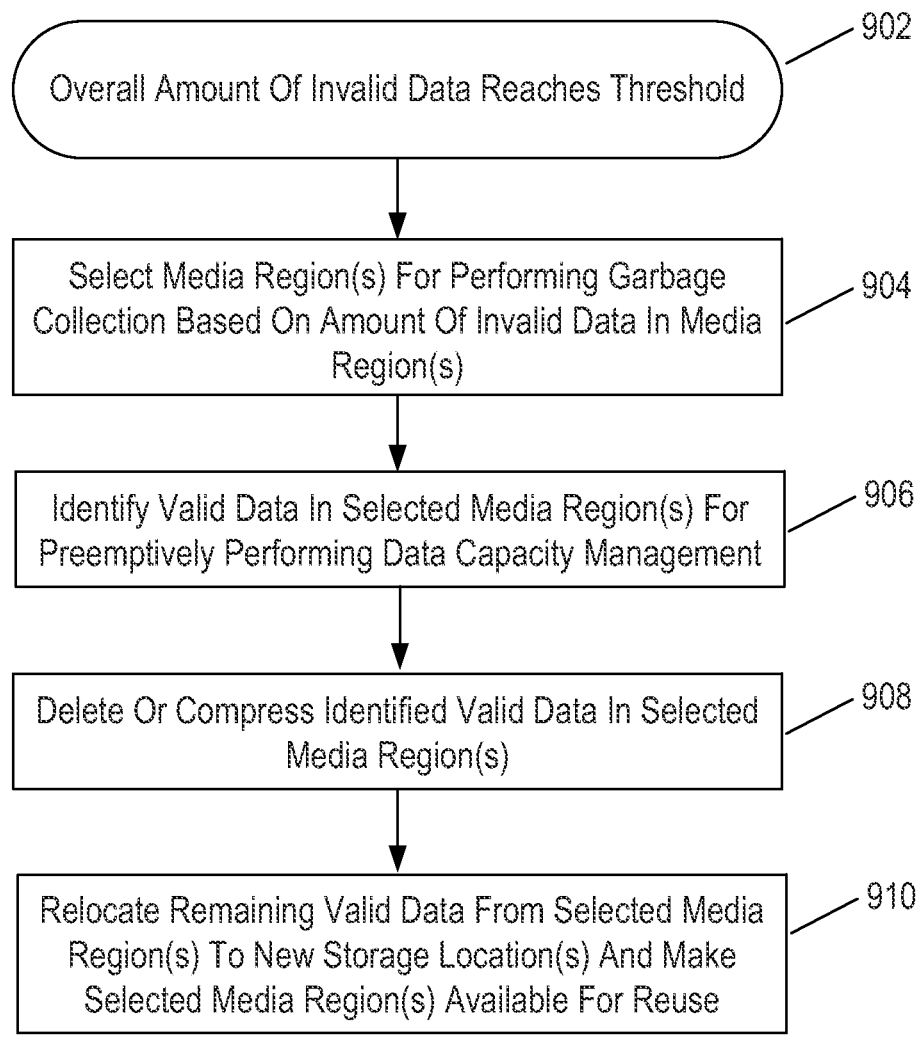
FIG. 9 is a flowchart for a garbage collection process according to an embodiment.

FIG. 9 is a flowchart for an example GC process that can be performed by controller 120 executing firmware 10 according to an embodiment. In block 902, controller 120 determines that an overall amount of invalid data stored in NVM of DSD 106 has reached a threshold amount of invalid data. The invalid data can, for example, include data that has been previously deleted, relocated to another DSD, or is an uncompressed version of data that has been compressed.

In block 904, controller 120 selects one or more media regions for performing GC to reclaim at least a portion of the one or more media regions for storing new data. The selection of the one or more media regions is based on the amount of invalid data in the one or more media regions. In one implementation, a media region with the most invalid data is selected for performing GC. In another implementation, media characteristics 14 can be used to select a media region with the greatest level of fragmentation.

In block 906, controller 120 identifies valid data in the selected media region or regions for preemptively performing data capacity management. By preemptively performing data capacity management as part of GC, it is ordinarily possible to reduce the amount of valid data that may need to be relocated during GC and take advantage of already performing GC in the selected media region or regions.

Controller 120 can use storage hints 12 and/or metadata 16 that is generated by DSD 106 to identify data for data capacity management in block 906. In one example, controller 120 may identify data that is older than an age threshold by using metadata 16 indicating when the data was received. This can ordinarily allow for a more efficient and effective GC process in cases where data has been grouped together by when it was received.

In another example, controller 120 may use metadata 16 to identify data with a higher risk of data loss or a lower relative priority. When using storage hints 12, controller 120 may, for example, identify data from a sensing device assigned with a lower priority or data from the same device or related devices to perform data capacity management. Controller 120 may also consider different metadata 16 or storage hints 12 than those provided in the examples above to identify valid data for data capacity management.

By using at least one of storage hints 12 and metadata 16, it is ordinarily possible to improve the efficiency and effectiveness of the GC process since more information is known by DSD 106 about the data received from different sensing devices.

In block 908, controller 120 deletes or compresses the identified valid data stored in the selected media region or regions. In this way, less valid data will need to be relocated from the selected media region or regions and additional space can be made for storing new data that is received by DSD 106.

In block 910, controller 120 relocates the remaining valid data in the selected media region or regions and makes the selected media region or regions available for reuse. The remaining valid data may be copied to one or more other media regions and the invalid data left in the selected media region or regions can be erased.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
a plurality of media regions for storing data; and
a controller configured to:
receive data from a sensing device of a plurality of sensing devices in communication with the DSD for storage in the DSD, wherein each sensing device of the plurality of sensing devices includes a sensor to detect a physical condition and provides the DSD with data representing the detected physical condition;
identify the sensing device sending the received data;
associate the received data with at least one storage hint assigned to the identified sensing device from among a plurality of storage hints assigned to different sensing devices of the plurality of sensing devices;
select a media region from the plurality of media regions for storing the received data based on the at least one storage hint and at least one characteristic of the media region;
store the received data in the selected media region;
generate metadata associated with data received from the sensing device and stored in the DSD that indicates a risk of data loss for different portions of cumulative data received from the sensing device and stored in the DSD;
determine whether a cumulative size of the cumulative data received from the sensing device and stored in the DSD has reached a first size threshold; and
in response to determining that the cumulative size has reached the first size threshold, identify at least a portion of the cumulative data received from the sensing device and stored in the DSD to delete or compress based on the generated metadata.

2. The DSD of claim 1, wherein the at least one storage hint includes at least one of a write access profile, a read access profile, a priority for data received from the sensing device, and whether data received from the sensing device is related to other data received from a different sensing device of the plurality of sensing devices.

3. The DSD of claim 1, wherein the controller is further configured to generate metadata associated with the received data that is used for managing a data storage size of the received data.

4. The DSD of claim 1, wherein the at least one characteristic of the media region includes at least one of a media type of the media region, a level of use of the media region, a remaining usable life of the media region, an available storage capacity of the media region, a level of fragmentation of data stored in the media region, a level of power associated with operating the media region, a number of zones in the media region, a time to read data from the media region, and a time to write data in the media region.

5. The DSD of claim 1, wherein the at least one storage hint includes an indication that data received from the sensing device is related to other data received from a different sensing device of the plurality of sensing devices, and wherein the controller is further configured to select a media region from the plurality of media regions based on the at least one storage hint so that the received data is stored in the same media region as the other data received from the different sensing device.

6. The DSD of claim 1, wherein the at least one storage hint includes a write access profile indicating that data received from the sensing device has a data rate greater than a threshold rate or is continuous for more than a predetermined period of time, and wherein the controller is further configured to select the media region so that the received data is stored in overlapping tracks on a rotating magnetic disk based on the write access profile.

7. The DSD of claim 1, wherein the at least one storage hint includes a write access profile indicating that data received from the sensing device has a data rate less than a threshold rate or is not continuous for more than a predetermined period of time, and wherein the controller is further configured to select the media region so that the received data is stored in non-overlapping tracks on a rotating magnetic disk or in a portion of a Non-Volatile Solid-State Memory (NVSM) based on the write access profile.

8. The DSD of claim 1, wherein the at least one characteristic of the media region indicates that a remaining usable life of the media region has reached a usage threshold or that an available storage capacity of the media region has reached a capacity threshold, and wherein the controller is further configured to compress the received data based on the indication that the remaining usable life of the media region has reached the usage threshold or that the available storage capacity of the media region has reached the capacity threshold.

9. The DSD of claim 1, wherein the controller is further configured to:
in response to determining that the cumulative size has reached the first size threshold, delete or compress the at least a portion of the cumulative data received from the sensing device and stored in the DSD to reach a second size threshold for the cumulative data received from the sensing device and stored in the DSD.

10. The DSD of claim 1, wherein the controller is further configured to:
select one or more media regions for performing a garbage collection process based on an amount of invalid data stored in the one or more media regions, wherein the garbage collection process reclaims at least a portion of the one or more media regions for storing new data; and
identify valid data to delete or compress in the one or more media regions as part of the garbage collection process.

11. The DSD of claim 10, wherein the controller is further configured to use the at least one storage hint or metadata generated by the DSD to identify the valid data to delete or compress.

12. A method of operating a Data Storage Device (DSD), the method comprising:
receiving data for storage in the DSD from a sensing device of a plurality of sensing devices in communication with the DSD, wherein each sensing device of the plurality of sensing devices includes a sensor to detect a physical condition and provides the DSD with data representing the detected physical condition;
identifying the sensing device sending the received data;
associating the received data with at least one storage hint assigned to the identified sensing device from among a plurality of storage hints assigned to different sensing devices of the plurality of sensing devices;
selecting a media region from a plurality of media regions of the DSD for storing the received data based on the at least one storage hint and at least one characteristic of the media region;
storing the received data in the selected media region;

generating metadata associated with data received from the sensing device and stored in the DSD that indicates a risk of data loss for different portions of cumulative data received from the sensing device and stored in the DSD;
determining whether a cumulative size of the cumulative data received from the sensing device and stored in the DSD has reached a first size threshold; and
in response to determining that the cumulative size has reached the first size threshold, identifying at least a portion of the cumulative data received from the sensing device and stored in the DSD to delete or compress based on the generated metadata.

13. The method of claim 12, wherein the at least one storage hint includes at least one of a write access profile, a read access profile, a priority for data received from the sensing device, and whether data received from the sensing device is related to other data received from a different sensing device of the plurality of sensing devices.

14. The method of claim 12, further comprising generating metadata associated with the received data that is used for managing a data storage size of the received data.

15. The method of claim 12, wherein the at least one characteristic of the media region includes at least one of a media type of the media region, a level of use of the media region, a remaining usable life of the media region, an available storage capacity of the media region, a level of fragmentation of data stored in the media region, a level of power associated with operating the media region, a number of zones in the media region, a time to read data from the media region, and a time to write data in the media region.

16. The method of claim 12, wherein the at least one storage hint includes an indication that data received from the sensing device is related to other data received from a different sensing device of the plurality of sensing devices, and wherein the method further comprises selecting a media region from the plurality of media regions based on the at least one storage hint so that the received data is stored in the same media region as the other data received from the different sensing device.

17. The method of claim 12, wherein the at least one storage hint includes a write access profile indicating that data received from the sensing device has a data rate greater than a threshold rate or is continuous for more than a predetermined period of time, and wherein the method further comprises selecting the media region so that the received data is stored in overlapping tracks on a rotating magnetic disk based on the write access profile.

18. The method of claim 12, wherein the at least one storage hint includes a write access profile indicating that data received from the sensing device has a data rate less than a threshold rate or is not continuous for more than a predetermined period of time, and wherein the method further comprises selecting the media region so that the received data is stored in non-overlapping tracks on a rotating magnetic disk or in a portion of a Non-Volatile Solid-State Memory (NVSM) based on the write access profile.

19. The method of claim 12, wherein the at least one characteristic of the media region indicates that a remaining usable life of the media region has reached a usage threshold or that an available storage capacity of the media region has reached a capacity threshold, and wherein the method further comprises compressing the received data based on the indication that the remaining usable life of the media region has reached the usage threshold or that the available storage capacity of the media region has reached the capacity threshold.

20. The method of claim 12, wherein the method further comprises:
in response to determining that the cumulative size has reached the first size threshold, deleting or compressing the at least a portion of the cumulative data received from the sensing device and stored in the DSD to reach a second size threshold for the cumulative data received from the sensing device and stored in the DSD.

21. The method of claim 12, further comprising performing a garbage collection process based on at least one of the at least one storage hint and the at least one characteristic of the media region, wherein the garbage collection process reclaims one or more portions of the media region storing data as available for storing new data.

22. The method of claim 12, further comprising:
selecting one or more media regions for performing a garbage collection process based on an amount of invalid data stored in the one or more media regions, wherein the garbage collection process reclaims at least a portion of the one or more media regions for storing new data; and
identifying valid data to delete or compress in the one or more media regions as part of the garbage collection process.

23. The method of claim 22, further comprising using the at least one storage hint or metadata generated by the DSD to identify the valid data to delete or compress.

24. A non-transitory computer readable medium storing computer-executable instructions for operating a Data Storage Device (DSD), wherein when the computer-executable instructions are executed by a controller of the DSD, the computer-executable instructions cause the controller to:
receive data for storage in the DSD from a sensing device of a plurality of sensing devices in communication with the DSD, wherein each sensing device of the plurality of sensing devices includes a sensor to detect a physical condition and provides the DSD with data representing the detected physical condition;
identify the sensing device sending the received data;
associate the received data with at least one storage hint assigned to the identified sensing device from among a plurality of storage hints assigned to different sensing devices of the plurality of sensing devices;
select a media region from a plurality of media regions of the DSD for storing the received data based on the at least one storage hint and at least one characteristic of the media region;
store the received data in the selected media region;
generate metadata associated with data received from the sensing device and stored in the DSD that indicates a risk of data loss for different portions of cumulative data received from the sensing device and stored in the DSD;
determine whether a cumulative size of the cumulative data received from the sensing device and stored in the DSD has reached a first size threshold; and
in response to determining that the cumulative size has reached the first size threshold, identify at least a portion of the cumulative data received from the sensing device and stored in the DSD to delete or compress based on the generated metadata.

* * * * *